United States Patent
Holdread

[15] 3,700,130
[45] Oct. 24, 1972

[54] SPARE WHEEL CARRIER

[72] Inventor: Robert N. Holdread, 23 Fern Drive, Elkhart, Ind. 46514

[22] Filed: June 29, 1970

[21] Appl. No.: 50,053

Related U.S. Application Data

[63] Continuation-in-part of Ser. No. 805,270, March 7, 1969, abandoned.

[52] U.S. Cl. .................................................. 214/454
[51] Int. Cl. ............................................. B62d 43/00
[58] Field of Search .............. 224/42.21, 42.12, 42.06; 214/454, 451, 452, 453, 450

[56] References Cited

UNITED STATES PATENTS

| | | | |
|---|---|---|---|
| 3,492,020 | 1/1970 | Musgrave | 224/42.21 |
| 1,472,983 | 11/1923 | Lawrence | 224/42.21 |
| 3,343,736 | 9/1967 | Sellers | 224/42.06 |
| 2,399,207 | 4/1946 | Clark | 214/453 |
| 602,611 | 4/1898 | Agnew | 214/142 |
| 3,283,973 | 11/1966 | Wargo | 224/42.21 |

*Primary Examiner*—Gerald M. Forlenza
*Assistant Examiner*—Lawrence J. Oresky
*Attorney*—Oltsch & Knoblock

[57] ABSTRACT

A spare wheel carrier, attachable to the exterior of a wheeled vehicle adjacent a wall thereof, which includes an arm pivotally connected to a bracket. The bracket is adapted for attachment to the vehicle so as to enable to the arm of the carrier to be swung in a substantially vertical plane parallel to the adjacent wall of the vehicle. Releasable lock means is provided in association with the bracket and arm to anchor the arm to the bracket and thus position a wheel mounting means carried by the arm in a wheel storing position.

9 Claims, 7 Drawing Figures

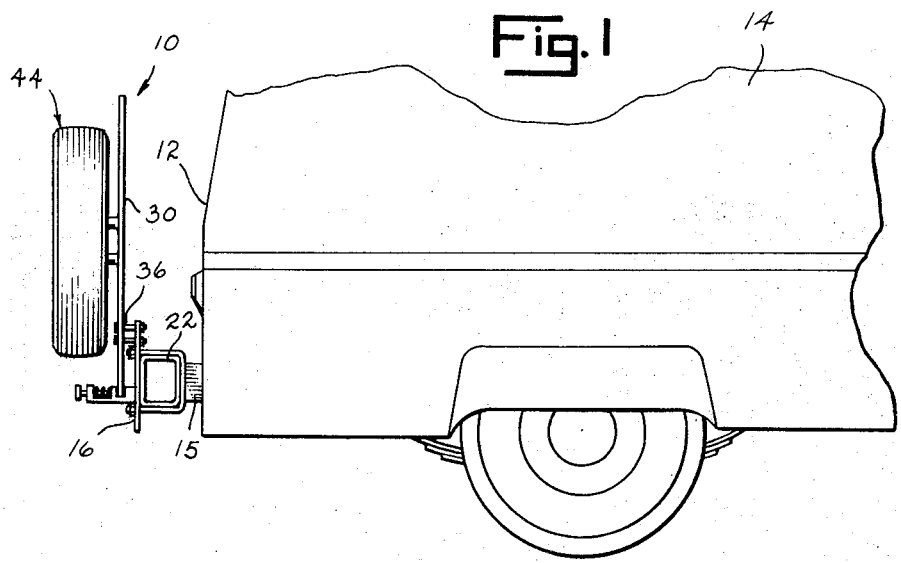
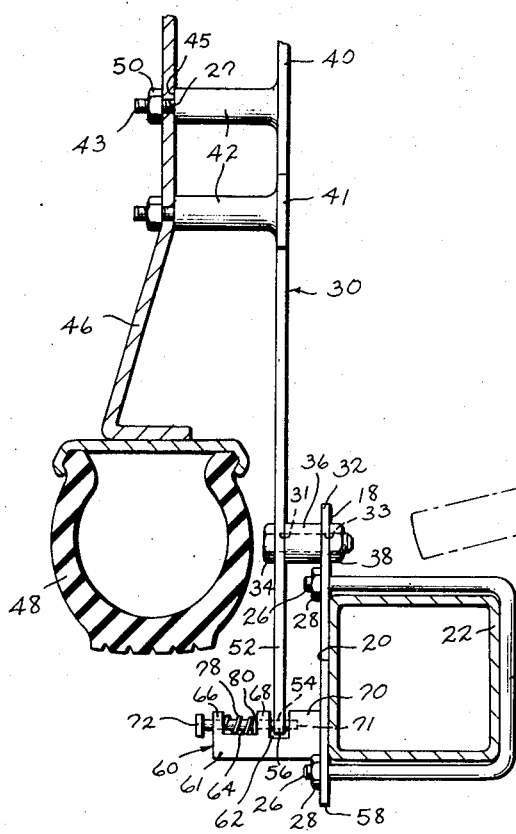
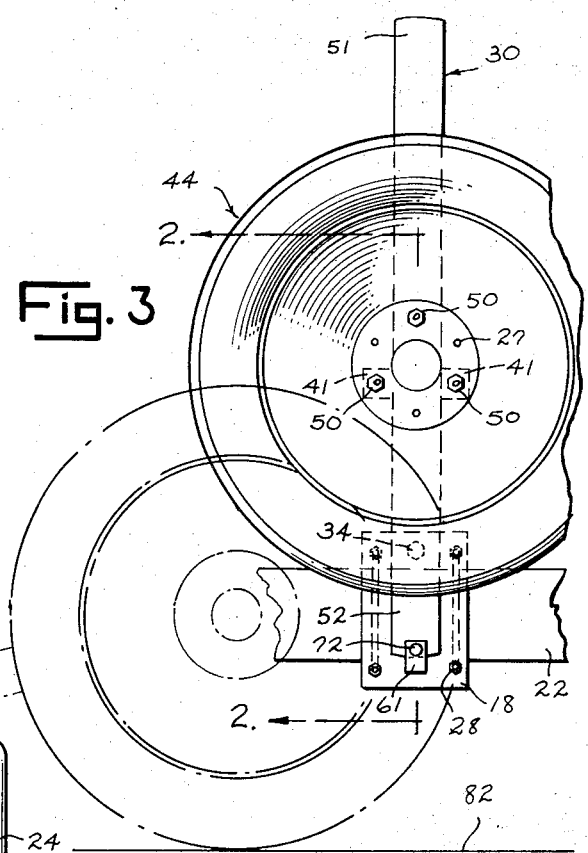
INVENTOR
ROBERT N. HOLDREAD
BY Oltsch & Knoblock
ATTORNEYS

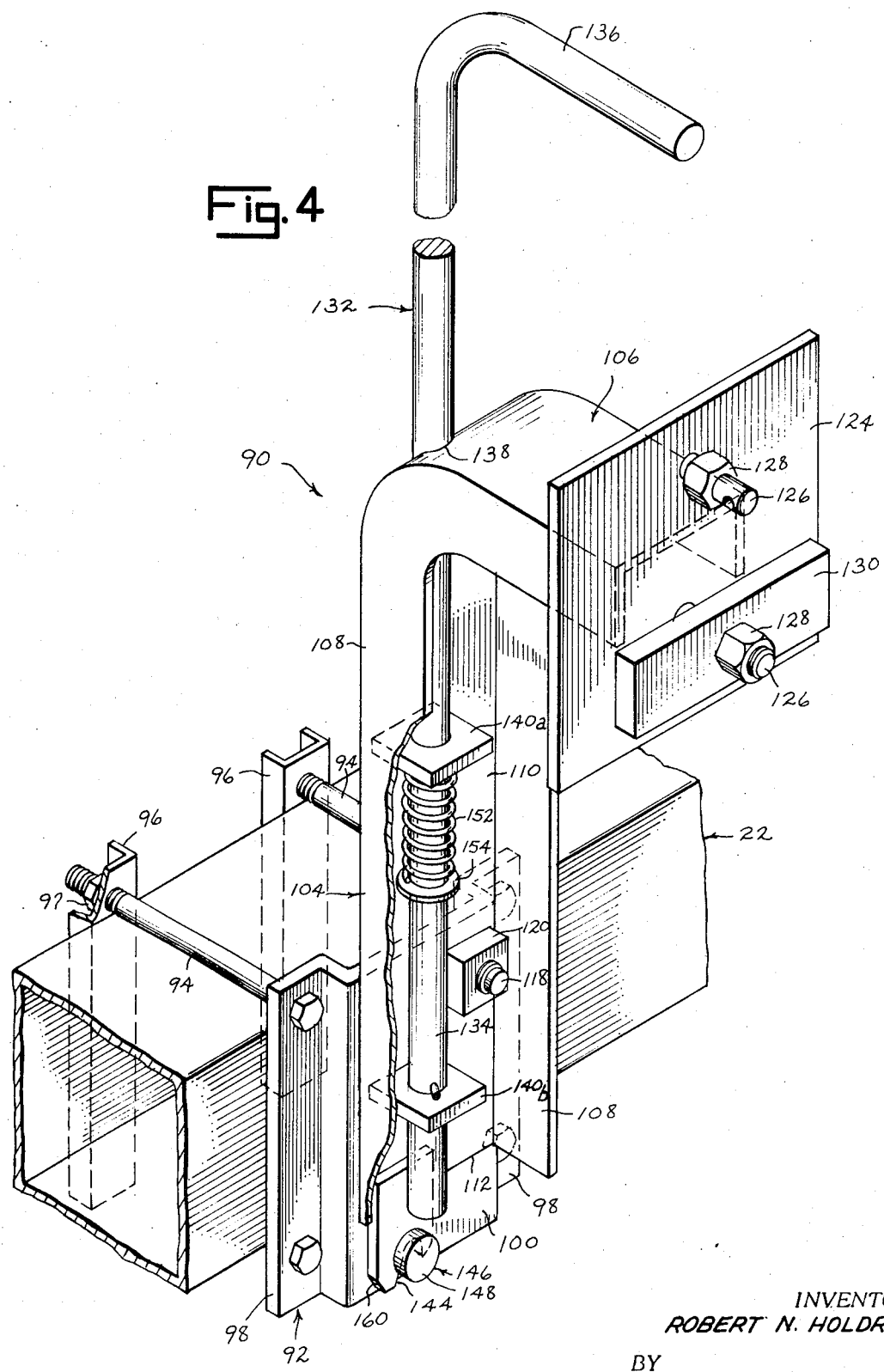

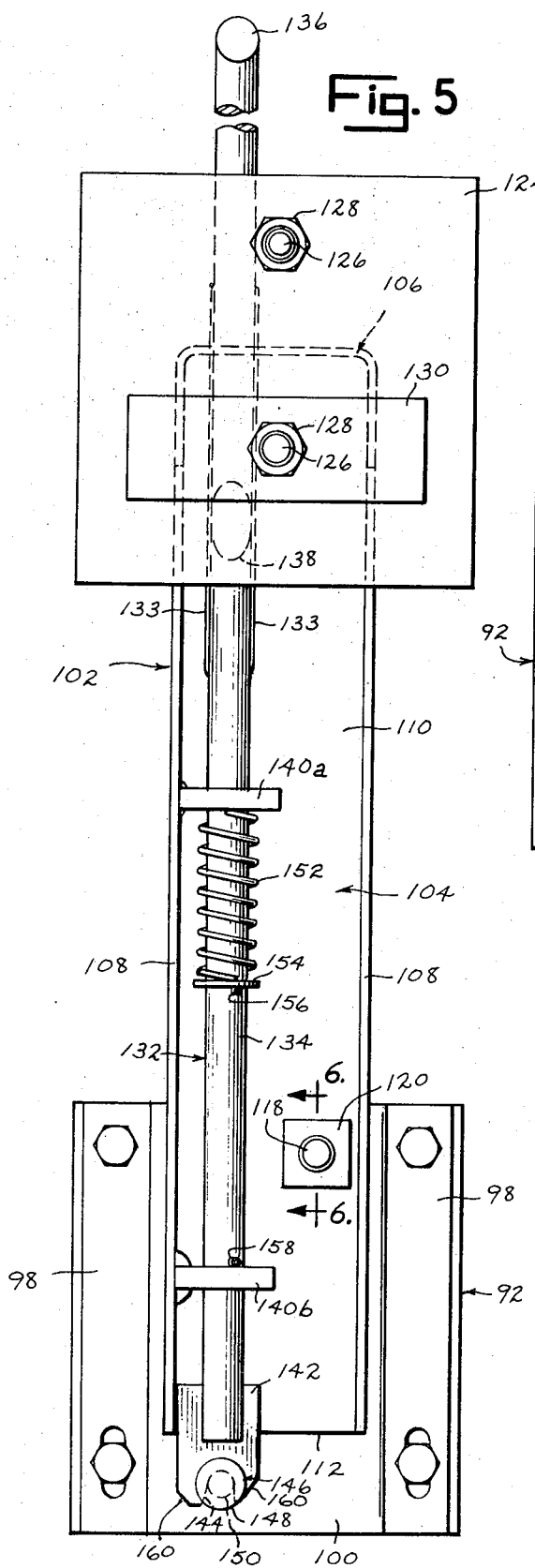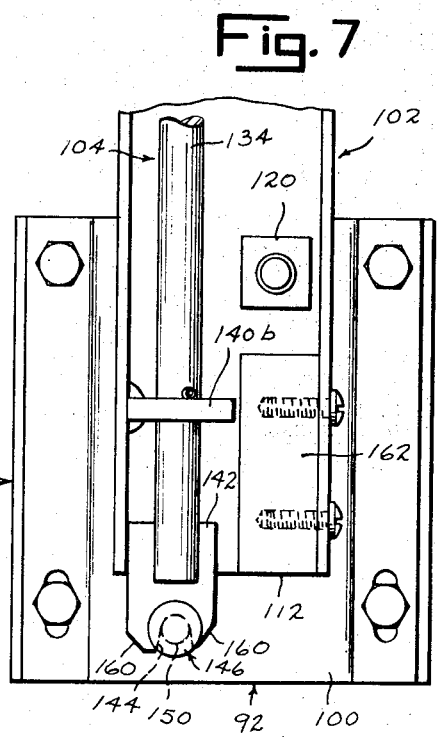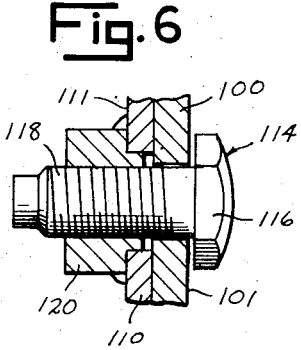

SPARE WHEEL CARRIER

CROSS-REFERENCE TO RELATED APPLICATION

This application is a continuation-in-part of my copending application Ser. No. 805,270, filed Mar. 7, 1969, now abandoned.

SUMMARY OF THE INVENTION

This invention relates to a spare wheel carrier which can be attached to the exterior of a wheeled vehicle and has specific application for mounting a spare tire to a mobile home, camper or similar type vehicle.

The spare wheel carrier of this invention includes a bracket adapted for securement to a wheeled vehicle and an arm which is adapted to carry the spare wheel. The arm is movable relative to the bracket in a generally vertical plane when the bracket is secured to the vehicle. A releasable lock means, having a portion thereof carried by or forming a part of the pivot arm and a cooperating interlocking portion carried by the bracket, is provided to releasably position the arm in a wheel storing position.

With regard to certain wheeled vehicles, such as mobile homes, trailers and campers, it is preferable to mount the spare wheel at the exterior of the vehicle in order to conserve storage space within the vehicle. In mounting the spare wheel at the exterior of the vehicle it is preferable to secure the spare wheel to an end or side wall of the vehicle instead of to the undercarriage of the vehicle in order to make the wheel more readily available for use when needed. Access to various peripheral wall storage compartments in mobile homes and like vehicles is generally through exterior doors. In having the spare wheel mounted to a side or end wall of the vehicle, the wheel may overlie one or more storage compartment doors, thereby making it first necessary to remove the wheel before access to such compartments can be obtained. This invention consists of a carrier for a spare wheel which can be easily and rapidly swung in a substantially vertical plane which is parallel to an adjacent exterior vehicle wall from a normal or travel position adjacent said wall of the vehicle to a second or access position.

Accordingly, it is an object of this invention to provide a spare wheel carrier which is attachable to the exterior of a wheeled vehicle in a storage or travel position adjacent a wall thereof and which can be swung from its storage position to a second position in a plane substantially parallel to said wall.

It is another object of this invention to provide a pivotal spare wheel carrier which is attachable to the exterior of a wheeled vehicle adjacent a wall thereof and which is of simplified and economical construction.

It is a further object of this invention to provide a spare wheel carrier which is attached to the exterior of a wheeled vehicle and locked in a storage position adjacent a wall of said vehicle and which can be rapidly unlocked from its storage position and swung in a substantially vertical plane parallel to said wall of the vehicle.

Other objects of this invention will become apparent upon a reading of the invention's description.

BRIEF DESCRIPTION OF THE DRAWINGS

FIG. 1 is a fragmentary side view of a mobile home or trailer showing one embodiment of my spare wheel carrier attached thereto.

FIG. 2 is a fragmentary enlarged detailed sectional view of the spare wheel carrier shown in FIG. 1 taken along line 2—2 of FIG. 3.

FIG. 3 is a fragmentary enlarged sectional view of the spare wheel carrier shown in FIG. 1 as viewed from the left of FIG. 1, showing in solid lines the carrier in its stored position and showing in broken lines the carrier in a second position which exposes the end wall of the trailer.

FIG. 4 is a perspective view of another embodiment of my spare wheel carrier shown attached to a vehicle bumper with the spare wheel removed therefrom for purposes of illustration.

FIG. 5 is a fragmentary elevational view of the spare wheel carrier shown in FIG. 4.

FIG. 6 is a fragmentary sectional view taken alone line 6—6 of FIG. 5.

FIG. 7 is a fragmentary view of the lower end portion of the pivot arm of the carrier of FIG. 5 shown in modified form.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

One embodiment of the spare wheel carrier of this invention is designated by the numeral 10 and is illustrated in FIGS. 1-3 as being attached to a rear member of a mobile home or trailer 14. It is to be understood that the carrier may alternatively be mounted at the front or either side of the trailer 14.

Spare wheel carrier 10 includes a bracket 16 which is adapted for securement to a frame part, such as the rear bumper, of trailer 14. Bracket 16 is illustrated as including a flat plate 18 having one side positioned against the substantially vertical outer side 20 of a square tubular member 22 which forms a part of the rear bumper of trailer 14. Tubular member 22 is rigidly secured to the undercarriage of trailer 14 by spaced supports 15. Two longitudinally spaced U-bolts 24 extend around tubular member 22 and have their threaded end parts 26 inserted through spaced apertures in flat plate 18. Nuts 28 are threaded on the threaded end parts 26 of the U-bolts 24 and tightened, causing flat plate 18 to be drawn and firmly held against side 20 of tubular member 22. As an alternative means of attachment, plate 18 may be welded to tubular member 22.

A rigid arm 30 is pivotally connected to the plate 18. Arm 30 has an aperture 31 intermediate its length which registers with an aperture 33 in the upper marginal portion 32 of plate 18, preferably centered between U-bolts 24 and located above tubular member 22. A headed bolt 34 having an elongated threaded shank is inserted with slight clearance through aperture 31 in arm 30. A spacer 36 having a bore therethrough encircles the shank portion of bolt 34. The shank of bolt 34 is inserted through aperture 33 in plate 18. A nut 38 is threaded on the shank of bolt 34 and is tightened, causing spacer 36 to be lightly held against plate 18 to position arm 30 in predetermined spaced relation to plate 18.

Arm 30 includes end parts 40 and 52 positioned on opposite sides of pivot aperture 31 therein. End part 40 of the arm preferably includes two opposite laterally projecting tabs 41 which are preferably coplanar with end part 40. Lugs 42 extend rearwardly relative to trailer 14 from tabs 41 and from the arm end part 40 adjacent tabs 41 to serve as a securement or mounting means for a spare wheel 44. Each lug 42 preferably has a reduced threaded end portion 43 defined in part by a shoulder 45.

A spare wheel 44 is attached to end part 40 of arm 30. Spare wheel 44 consists of a member 46 carrying a rim which mounts a tire 48. Member 46 has a plurality of apertures 27 spaced to receive the threaded end portions 43 of lugs 42. Nuts 50 are threaded onto the exposed end portions 43 of lugs 42 and serve to hold the member 46 securely against the shoulders 45 of lugs 42. End part 40 of arm 30 preferably projects beyond the periphery of the mounted spare tire 48 to provide a handle 51.

End part 52 of arm 30 is preferably of a length which is less than the spacing between bolt 34 and lower edge 58 of plate 18 and has an aperture 54 therein adjacently spaced from its tip 56. Bracket 16 includes a lock or latch member 60 which is secured to and projects from plate 18 and which is positioned preferably below bolt 34 and adjacent lower edge 58 of the plate so as to project into the path of arm end part 52. Latch member 60 includes a housing part 61 having spaced transverse slots 62 and 64 which are partly defined by wall parts 66, 68 and 70. Slot 62 of latch member 60 is of a size and position to receive with slight clearance the arm end part 52, as best shown in FIG. 2. Wall parts 66, 68 and 70 of latch member 60 have aligned bores 71 therein which register with aperture 54 in arm 30 when tip 56 thereof is received within slot 62. A lock pin 72 having a shank and an enlarged head is disposed within housing part 61 with its shank slidably received within bores 71.

A stop 80 is secured to and projects from the shank of pin 72 and is shiftable within slot 64 in housing part 61. A coil spring 78 is positioned within slot 64 and surrounds the shank of pin 72. One end of coil spring 78 abuts one face of wall 66 and its opposite end abuts stop 80 so as to urge the pin 72 to a locking position extending into the bore 71 in wall 70 of housing part 61.

When arm 30 is positioned with its tip 56 received within slot 62 of housing part 61 and with aperture 54 in the tip receiving pin 72, as best shown in FIGS. 2 and 3, the spare wheel 44 is locked in its storage position. When it is desired to shift wheel 44 from its storage position to permit access to the part of the trailer which the wheel confronts in its storage position, the carrier user first grasps handle 51 with one hand and grasps the head of lock pin 72 with the other hand. Pin 72 is then pulled outwardly until its end clears aperture 54 in arm 30 to release the arm 30 to pivot about bolt 34 in a plane substantially parallel to wall 12 of the trailer. Wheel 44 attached to arm 30 may then be lowered by means of handle 51 until it rests upon the ground 82. When it is desired to return wheel 44 to its storage position, handle 51 is grasped and arm 30 swung upwardly until lock pin 72 can be reinserted through aperture 54 in the arm.

It is to be understood that lock pin 72 is merely illustrative of one of several types of latch means that may be used to engage and lock the end part 52 of arm 30. By extending end part 40 of arm 30 beyond the periphery of wheel 44 to provide a handle 51, the leverage of arm 30 is increased thus making it easier to raise and lower the wheel 44.

Another embodiment of the spare wheel carrier of this invention is illustrated in FIGS. 4–6 and will be designated by the numeral 90. Spare wheel carrier 90 includes a bracket 92 which is adapted for securement to a support part, such as tubular member 22 of the rear bumper of trailer 14. Bracket 92 may be secured to tubular member 22 in the manner previously described for attaching bracket 16 of spare wheel carrier 10 to the tubular member or, as an alternative means of securing the bracket 92 to the bumper member, straight bolts 94 may be substituted for the U-bolts 24 of spare wheel carrier 10 and such bolts secured to anchor plates 96 by nuts 97 so as to clamp tubular member 22 between bracket 92 and plates 96. Bracket 92 includes spaced marginal portions 98 which facedly engage tubular member 22 and which are interconnected by an outwardly projecting web 100.

A rigid arm 102 is pivotally connected to bracket 92 at web 100 and is adapted to swing in a plane substantially parallel to the trailer wall beside which bracket 92 is mounted. Arm 102 includes an end part 104 which is connected to bracket 92 and a free end part 106 which is bent in a substantially right-angular relationship to end part 104 and which projects rearwardly relative to the trailer. Arm 102 is preferably channel-shaped in cross section and includes sides 108 interconnected by a web 110. The pivot connection of arm 102 to bracket 92 is preferably inwardly spaced from end 112 of arm end part 104 and located adjacent one side 108 of the arm, off-set from the longitudinal axis of arm 102. Referring to FIG. 6, such a pivot connection may consist of registering apertures formed in web 100 of bracket 92 and web 110 of arm 102 through which a bolt 114 is inserted with clearance. The head 116 of bolt 114 abuts the inner face 101 of bracket web 100, and the shank 118 of the bolt is threaded into a lock nut 120 welded to the outer face 111 of arm web 110. Free end part 106 of arm 102 carries a mounting plate 124. Suitable lugs 126 extend rearwardly relative to the trailer from the mounting plate 124 and in association with nuts 128 and a hold-down bar 130 serves as a securement or mounting means for the spare wheel (not shown).

A rigid actuator rod 132 having an elongated shank 134 and a handle part 136 is utilized to lock arm 102 of carrier 90 in its upright storage position, as seen in FIG. 5, to bracket 92. Shank 134 of rod 132 extends along arm end part 104, between sides 108 of the arm, adjacent the outer face 111 of arm web 110, and through an aperture 138 in web 110 at free end part 106 of arm 102 where it joins arm handle part 136. Handle part 136 is spaced sufficiently from mounting plate 124 so as to be located slightly beyond the outer periphery of the spare wheel carried by the arm in all operative positions of the rod. Shank 134 of rod 132 is shiftably carried within spaced brackets or guide members 140a and 140b which are fixedly attached, such as by welding, to arm end part 104. Rod shank 134 includes a lock member 142 which is carried at the free end of the rod shank and which is preferably positioned adjacent edge 112 of arm 102. Lock member 142 has a slot 144 formed therein.

A lock pin 146 is welded or otherwise secured to carrier bracket 92 spacedly below end 112 of arm 102 and in alignment with slot 144 in rod 132 when the arm is positioned in its storage position shown in FIG. 5. Lock pin 146 preferably includes a head 148 which is spaced from bracket 92 and a shank 150. Rod 132 is shiftable longitudinally relative to free end part 106 of arm 102 between a lock position in which lock member 142 partially encircles lock pin 146 with the shank 150 thereof being received within slot 144, as illustrated in FIG. 5, and a release position in which lock member 142 is disengaged from lock pin 146 so as to permit arm 102 to pivot relative to bracket 92 and thus allow the user of the carrier to lower the spare wheel carried by the arm to the ground or any other position of rest. Rod 132 is normally urged into its lock position by means of a helical spring 152 which encircles the shank 134 of the rod and is positioned between guide members 140a and 140b. Spring 152 has one end abutting the upper guide member 140a as determined when the arm is in its wheel storage position and its opposite end abutting a washer 154 which encircles rod shank 134 and which is fixed in position along the shank between the guide members by means of a pin 156 inserted transversely through the shank. A pin 158 is inserted transversely through rod shank 134 above the lower guide member 140b so as to abut the lower guide member 140b when lock member 142 of rod 132 is urged into its lock position by spring 152.

With the spare wheel secured to mounting plate 124 and arm 102 locked to bracket 92 in its wheel storage position, the user of carrier 90 grasps handle part 136 of rod 132 which projects upwardly beyond the periphery of the wheel and pulls upwardly on the handle to cause the rod to shift from its lock position into its release position with lock member 142 freed from contact with lock pin 146. While still grasping rod handle part 136, the carrier user then shifts arm 102 about its pivot connection until the spare wheel rests upon the ground. Lock pin 146 is spaced sufficiently below end 112 of arm 102 so that the pin does not contact or interfere with the pivotal movement of the arm as the spare wheel is lowered. Once the wheel is lowered, handle part 136 of rod 132 is released and spring 152 urges the rod from its release position into its lock position with pin 158 carried by rod shank 134 abutting guide member 140b. To return the arm 102 to its stored position, the user of the carrier grasps rod handle part 136 and swings the arm upwardly about its pivot connection. Edges 160 of lock member 142 are beveled so that as arm 102 approaches its upright storage position, one of the edges 160, depending upon the direction of movement of the arm, will engage shank 150 of the lock pin 146 and cause rod 132 to be cammed upwardly and over the lock pin shank until slot 144 in lock member 142 is aligned with the shank. Once slot 144 and shank 150 are in alignment, spring 152 urges rod 132 downwardly and causes the slot defining portion of the lock member to be received about the pin shank and thus lock arm 102 to bracket 92. Slot 144 is of sufficient depth so that interferring engagement between the lock member 142 and pin 146 will occur to prevent separation of the lock member and pin should an attempt be made to pivot the arm clockwise as viewed in FIG. 5 without manually shifting the rod 132 into its release position.

Pivotal movement of arm 102 with a wheel attached to mounting plate 124 is facilitated by having the pivot connection of the arm to bracket 92 in an off-set position at all times from the center of gravity of mounting plate 124 and therefore the center of gravity of the wheel carried by the plate. Additionally, lock pin 146 is off-set horizontally from the pivot connection of arm 102 so that the weight of the arm and wheel carried thereby causes the lock member 142 to press downwardly upon lock pin 146 and thus maintain a firm interlocking engagement with the pin. Rotational movement of rod 132 within guide members 140a and 104b may be prevented by forming one or more longitudinally extending ribs 133 on the rod which slidably fit, in all operative positions of the rod, within complementary slots in aperture 138 in arm 102. Head 148 of lock pin 146 abuts lock member 142 and resists any tendency for arm 102 to twist while carrying a spare wheel. To further facilitate movement of arm 102 with a wheel mounted thereto, a weight 162 may be attached to arm 102 adjacent end 112 thereof as shown in FIG. 7.

It is to be understood that the invention is not to be limited to the details herein given, but may be modified within the scope of the appended claims.

What I claim is:

1. A spare wheel carrier attachable to the exterior of a wheeled vehicle comprising a bracket adapted for securement to said vehicle beside an upright wall thereof, an arm, means pivotally connecting said arm to said bracket so as to enable said arm to be shifted in a plane substantially paralleling said wall when said bracket is secured to said vehicle, one end part of said arm including a spare wheel mounting means, a releasable lock means having first and second interlocking portions spaced from the pivot connection of said arm, said first lock portion carried by said arm at the other end part of the arm and said second lock portion carried by said bracket to releasably lock said arm to said bracket and position said arm in a wheel storage position, said first lock portion including rod means shiftable relative to said arm between a lock position wherein said rod means is engageable with said second lock portion so as to lock said arm to said bracket and a release position wherein said rod means is disengaged from said second lock portion so as to permit pivotal movement of said arm.

2. The spare wheel carrier of claim 1 wherein said rod means includes a handle part adapted to extend beyond the outer periphery of a wheel mounted to said spare wheel mounting means, said arm including rod guide parts, said rod means being shiftable longitudinally relative to said guide parts between its said lock and release positions.

3. The spare wheel carrier of claim 1 wherein said second lock portion is a pin carried by said bracket, said rod means including a slotted part at one end thereof interlockable with said pin when said rod means is shifted into its lock position.

4. The spare wheel carrier of claim 3 wherein said pin includes a flanged head spaced from said bracket and a shank extending from said head to said bracket, the slotted part of said rod means positioned between said bracket and pin head and engaging said pin shank when interlocked with said pin.

5. The spare wheel carrier of claim 1 including means normally biasing said rod into its lock position.

6. The spare wheel carrier of claim 1 wherein the pivot connection of said arm is laterally off-set from the gravitational center of said wheel mounting means when said arm is in its wheel storage position.

7. A spare wheel carrier attachable to the exterior of a wheeled vehicle comprising a bracket adapted for securement to said vehicle beside an upright wall thereof, an arm, means pivotally connecting said arm to said bracket so as to enable said arm to be shifted in a plane substantially paralleling said wall when said bracket is secured to said vehicle, one end part of said arm including a spare wheel mounting means, a releasable lock means having first and second interlocking portions spaced from the pivot connection of said arm, said first lock portion carried by said arm at the other end part of the arm and said second lock portion carried by said bracket to releasably lock said arm to said bracket and position said arm in a wheel storage position, said second lock portion being immovably secured to said bracket and projecting into said plane of movement of said arm.

8. A spare wheel carrier attachable to the exterior of a wheeled vehicle comprising a bracket adapted for securement to said vehicle beside an upright wall thereof, an arm, means pivotally connecting said arm to said bracket so as to enable said arm to be shifted in a plane substantially paralleling said wall when said bracket is secured to said vehicle, one end part of said arm including a spare wheel mounting means, a releasable lock means having first and second interlocking portions spaced from the pivot connection of said arm, said first lock portion carried by said arm at the other end part of the arm and said second lock portion carried by said bracket to releasably lock said arm to said bracket and position said arm in a wheel storage position, said pivot connection including a part which forms a portion of said bracket and which has an aperture therein and a support member inserted through said aperture, said arm having an aperture intermediate its length receiving said support member, said pivot connection part being positionable parallel to and spaced from said vehicle wall to enable said arm to be pivoted in a plane substantially parallel to said wall.

9. A spare wheel carrier attachable to the exterior of a wheeled vehicle comprising a bracket adapted for securement to said vehicle beside an upright wall thereof, an arm, means pivotally connecting said arm to said bracket so as to enable said arm to be shifted in a plane substantially paralleling said wall when said bracket is secured to said vehicle, one end part of said arm including a spare wheel mounting means, a releasable lock means having first and second interlocking portions spaced from the pivot connection of said arm, said first lock portion carried by said arm at the other end part of the arm and said second lock portion carried by said bracket to releasably lock said arm to said bracket and position said arm in a wheel storage position, said pivot connection of said arm being located between arm end parts, said other arm end part including weight means for at least partially counterbalancing the weight of a wheel mounted to said wheel mounting means.

* * * * *